(No Model.)
W. WALTER.
UNDERGROUND CONDUIT FOR CABLES, ELECTRIC WIRES, &c.
No. 323,241. Patented July 28, 1885.
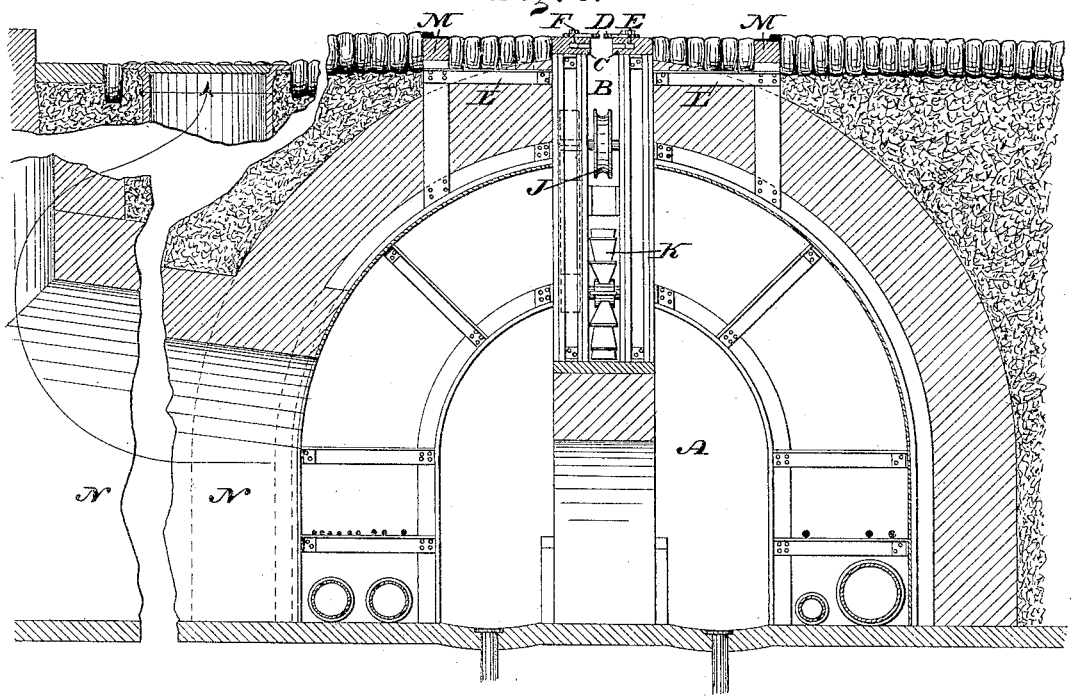
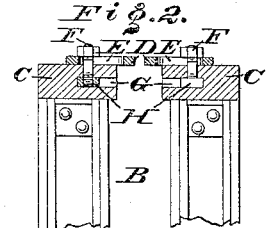
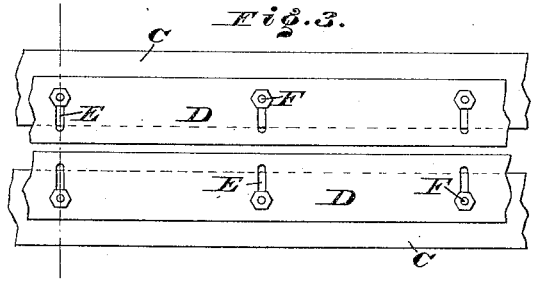

UNITED STATES PATENT OFFICE.

WILLIAM WALTER, OF PHILADELPHIA, PENNSYLVANIA.

UNDERGROUND CONDUIT FOR CABLES, ELECTRIC WIRES, &c.

SPECIFICATION forming part of Letters Patent No. 323,241, dated July 28, 1885.

Application filed March 31, 1885. (No model.)

*To all whom it may concern:*

Be it known that I, WILLIAM WALTER, a citizen of the United States, residing in the city and county of Philadelphia, State of Pennsylvania, have invented a new and useful Improvement in Underground Conduits for Cables, Electric Wires, &c., which improvement is fully set forth in the following specification and accompanying drawings, in which—

Figure 1 represents a vertical section of an underground conduit embodying my invention. Fig. 2 represents a view of a section of a portion thereof on an enlarged scale. Fig. 3 represents a top or plan view of a detached portion.

Similar letters of reference indicate corresponding parts in the several figures.

My invention relates to underground conduits for cables, electric wires, &c.; and it consists in certain details in the construction thereof, whereby a passage-way formed in the walls of the same may be adapted to serve as a second conduit, and in other details hereinafter set forth.

Referring to the drawings, A represents an underground conduit for electric wires having an opening or passage-way extending lengthwise in the upper portion of its arch, in which passage-way are formed the walls of the conduit B, in which may be placed the cable of a traction road, the latter consisting of suitable side plates and columns, which are supported on masonry or other foundation in the trench, and rise through the crown of the conduit A, thereby serving to strengthen or brace the walls of the said conduit A. On the top of the conduit B are supported and secured wooden stretchers or sill-pieces C, which are separated from each other, and support metal bars or plates D, forming the slot-irons of the conduit. In the bars D are transversely-extending slots E, through which are passed the bolts F, by which the bars are secured to the stringers, and provision is made for setting the bars nearer to or farther from each other, and thus adjusting the slot-irons relatively to contraction, expansion, &c. In the inner sides of the stringers are mortises G, for receiving nuts H, into which the lower ends of the bolts F are screwed for firmly holding the irons in adjusted position.

Within the conduit B are pulleys J for the cable, and fans K, which receive power from the pulleys, the latter being rotated by the passage of the cable. By this provision a circulation of air may be maintained within the conduit, and the latter accordingly ventilated.

The conduit B is braced by angle or T irons L, which are connected with the sides of said conduit and the conduit A, and the stringers M of the car-tracks are connected with said irons, thus producing a strong structure.

The conduit A may receive electric wires, and steam, gas, water, and sewer-pipes, thus adapting the conduit for many purposes, and access is had to the same within the conduit, so that tearing up or disturbing the street is not required for such access.

In order to reach the interior of the conduit, an opening is made in the side thereof, and the same is in communication with a pit, N, which is formed in the ground and opens at top at the sidewalk, where it is properly covered, whereby access is had to the conduit A from the sidewalk instead of the street.

Having thus described my invention, what I claim as new, and desire to secure by Letters Patent, is—

1. A conduit adapted for electric wires provided with a passage-way constructed in its upper wall and adapted to serve as a conduit for cables, substantially as described.

2. A conduit provided with mortised stringers and slot-irons with transversely-extending slots and securing-bolts, substantially as and for the purpose set forth.

3. A conduit, A, having a second conduit, B, the latter provided with a ventilating-fan in the lower part thereof, substantially as described.

4. A cable-conduit, in combination with a conduit for electric wires, &c., provided with bracings, which are attached to said conduits, substantially as and for the purpose set forth.

5. A conduit for electric wires, &c., in combination with a conduit for cables for traction purposes, the latter conduit rising through the former, substantially as and for the purpose set forth.

6. The conduit A, having an opening in its upper walls forming a second conduit, the base of the said second conduit being supported on masonry within the said conduit A, substantially as described.

7. The conduit A, adapted for electric wires and provided with a second conduit, B, formed as described, the said second conduit, B, being provided with a ventilating-fan and pulleys, substantially as described.

WILLIAM WALTER.

Witnesses:
JOHN A. WIEDERSHEIM,
A. P. GRANT.